United States Patent [19]

Moskalik

[11] 4,096,798
[45] Jun. 27, 1978

[54] PRESS SLIDE ADJUSTING AND OVERLOAD PROTECTION ASSEMBLY

[75] Inventor: James M. Moskalik, Hastings, Mich.

[73] Assignee: Gulf & Western Manufacturing Company, Southfield, Mich.

[21] Appl. No.: 777,006

[22] Filed: Mar. 14, 1977

[51] Int. Cl.² .............................................. F16P 7/00
[52] U.S. Cl. ..................................... 100/53; 74/584; 83/530; 100/257; 192/150
[58] Field of Search ................... 100/53, 257, 292, 48, 100/50; 83/530, 628, 529; 192/150; 74/583, 584; 72/452, 431, 446, 432

[56] References Cited

U.S. PATENT DOCUMENTS

| 1,565,089 | 12/1925 | Gauthier | 74/584 |
|---|---|---|---|
| 1,788,071 | 1/1931 | Strout | 100/257 |
| 1,808,606 | 6/1931 | Pels | 100/53 |
| 1,847,620 | 3/1932 | Miller | 74/584 |
| 2,790,204 | 4/1957 | Edwards | 100/257 |
| 2,812,843 | 11/1957 | Hummel | 74/584 |
| 3,005,404 | 10/1961 | Tucker | 100/257 |
| 3,892,143 | 7/1975 | Kleister | 100/53 |

FOREIGN PATENT DOCUMENTS

491,309  3/1953  Canada .................................. 100/53

Primary Examiner—Billy J. Wilhite
Attorney, Agent, or Firm—Meyer, Tilberry & Body

[57] ABSTRACT

An assembly is disclosed which is rigidly connected between a press slide and a slide driving component. The assembly is concentric with the slide axis and enables both axial adjustment of the slide position and overload protection for the slide during press operation. The assembly includes relatively slidable telescoping components, one of which is provided with an adjusting ring facilitating adjustment of the slide position relative to the press bed. The other component is provided with a shoulder spaced from and facing the adjusting ring, and a load responsive shear fixture is interposed between the shoulder and adjusting ring to provide overload protection.

18 Claims, 8 Drawing Figures

PRESS SLIDE ADJUSTING AND OVERLOAD PROTECTION ASSEMBLY

The present invention relates to the art of presses and, more particularly, to a slide adjustment and overload protection arrangement for presses.

The present invention finds particular utility in conjunction with adjusting the shut height of the outer slide of a double action press and providing overload protection for the outer slide. Accordingly, the invention will be described herein in conjunction with a double action press; however, it will be appreciated that the invention is readily applicable to other press structures.

It is well known, of course, that a double action press has an outer slide supported for reciprocation by gibbing between the slide and press frame, and an inner slide supported for reciprocation by gibbing between the outer and inner slides. Generally, in a double action press tooling on the outer slide functions to hold a metal blank and tooling on the inner slide functions to shape the blank. The two slides are driven through strokes coordinated to achieve the respective functions during the slide strokes, and each slide has a shut height which is the distance between the slide and press bed when the slide is in its lowermost or bottom dead center position. Further, the two slides are independently adjustable to facilitate adjustment of the shut height of each slide. In addition to an adjustment capability with regard to the shut height of the slide, it is desirable to provide overload protection which functions to release the slide and/or stop the press in the event of the imposition of an overload on the press during movement of the slide through the work stroke.

Presses have of course been provided heretofore with slide adjusting and/or overload protection arrangements for the foregoing purposes. With regard to adjusting the shut height of a slide it is desirable to provide for single point adjustment, in other words a capability of adjusting a slide at a single location with respect to the press. Such arrangements heretofore provided have not included overload protection for the slide in conjunction with the adjusting arrangement. Thus, the slide either has no overload protection at all or has protection which requires overload responsive components at some other location in the press structure. Any overload protection so provided requires a separate overload assembly or assemblies, thus increasing production and maintenance costs with respect to the press.

Other arrangements heretofore provided have incorporated overload protection and slide adjustment at multiple locations laterally spaced from the slide axis. For example, a plurality of tie rods are often incorporated in the slide frame structure, and adjustment and overload protection for the slide has been incorporated in each of the tie rods. Such an arrangement is undesirable for several reasons. In this respect, uneven loading of the slide during the work stroke imposes different forces through the separate tie rods, whereby an overload can actuate the overload protection arrangement in one tie rod without the arrangements in the other tie rods being actuated. Accordingly, the overload can go undetected. Moreover, actuation of just one overload arrangement can cause misalignment of the press slide and its gibbing, thus imposing undesirable wear therebetween and possibly otherwise damaging the press. Additionally, replacement of multiple overload protection assemblies is time consuming, and adjustment of each tie rod to achieve a desired shut height for the slide is time consuming and makes it difficult if not impossible to achieve uniformity of adjustment between the tie rods. This too can add to the imposition of unequal loads through the several tie rods and thus overload actuation of just one rather than all of the overload assemblies.

In accordance with the present invention, a single point adjustment and overload protection assembly is provided which advantageously overcomes or avoids the disadvantages encountered in conjunction with slide adjustment and overload protection arrangements heretofore provided. The assembly in accordance with the present invention is coaxial with the slide axis and is directly connected between the press slide and a driven component of the drive mechanism for the slide. Further, the assembly includes a pair of relatively reciprocable members coaxial with the slide and interengaged by adjusting and overload protection components which enable adjustment of the shut height of the slide and which releaseably hold the two members against relative movement therebetween until such time as an overload is imposed on the slide.

Preferably, the adjusting and overload components include an adjusting ring threadedly interengaged with one of the members and a shear fixture interposed between the adjusting ring and a shoulder of the other member. The adjusting ring enables adjustment of the axial position of the one member and thus the slide relative to the other member so as to adjust the shut height of the slide. During normal press operation, the adjusting ring and shear fixture maintain the one member against axial displacement relative to the other and, upon occurrence of an overload, the shear fixture fractures to permit movement of the one member relative to the other. Preferably, a switch or the like is associated with the assembly to detect such movement between the members and to shut down the press in response thereto.

It is accordingly an outstanding object of the present invention to provide an improved adjusting and overload protection assembly for a press slide.

Another object is the provision of an assembly of the foregoing character which is coaxial with and directly connected to the press slide, thus to enable single point adjustment and more uniform loading of the overload protection components.

Still another object is the provision of an assembly of the foregoing character in which the overload protection components are readily accessible whereby removal and replacement thereof is simple and achieved with a minimum expenditure of time.

A further object is the provision of an assembly of the foregoing character which is comprised of a minimum number of parts structured and interrelated in a manner which minimizes production costs and time and minimizes maintenance time and expense.

Yet a further object is the provision of an assembly of the foregoing character which is highly efficient in connection with both adjustment of the slide shut height and response to overload on the slide during press operation.

The foregoing objects, and others, will in part be obvious and in part pointed out more fully hereinafter in conjunction with the written description of a preferred embodiment of the invention shown in the accompanying drawings in which:

Figure 1:
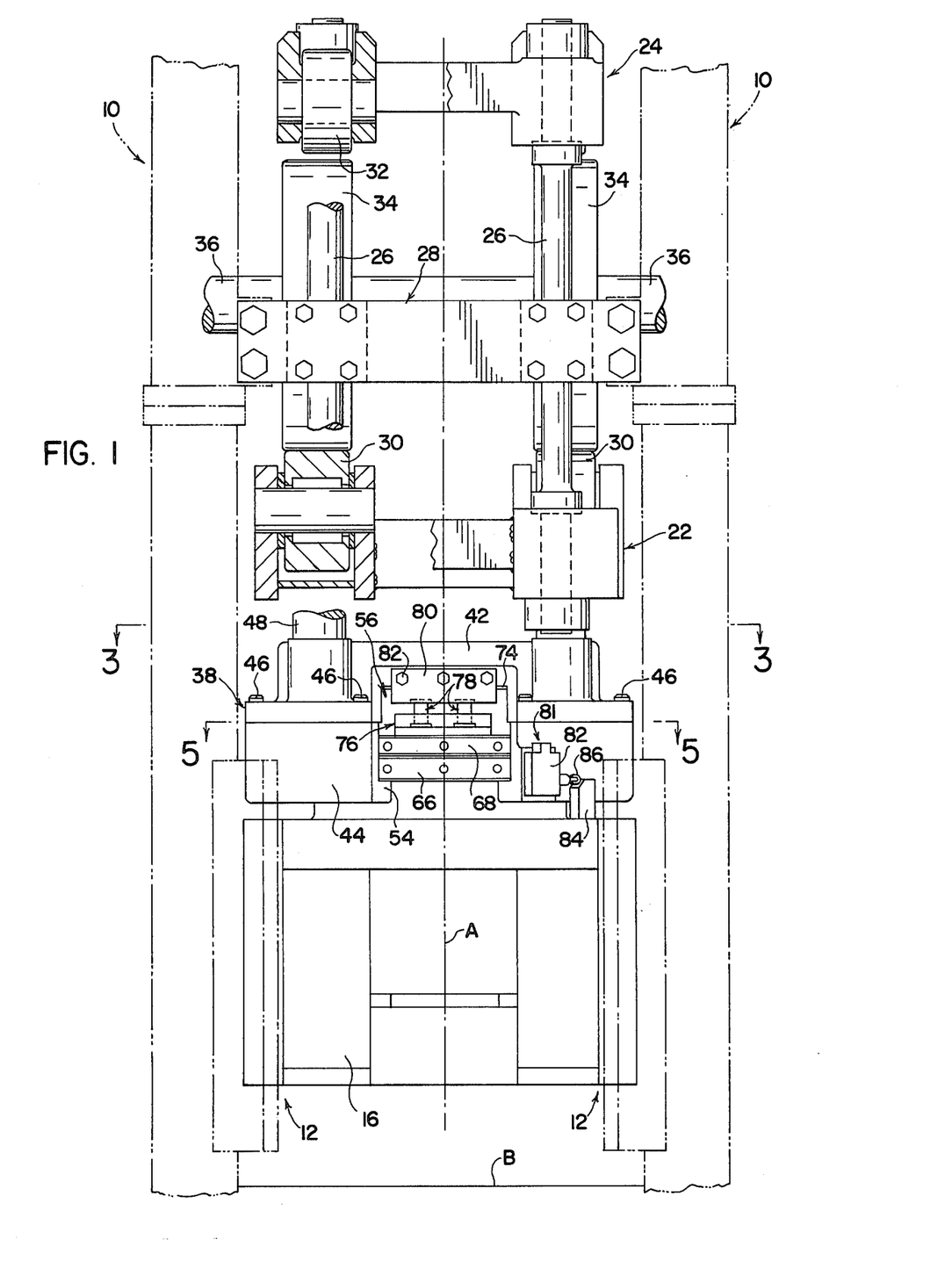
FIG. 1 is a front elevation view of a portion of a double action press incorporating the adjusting and overload protection assembly of the present invention.
Figure 2:
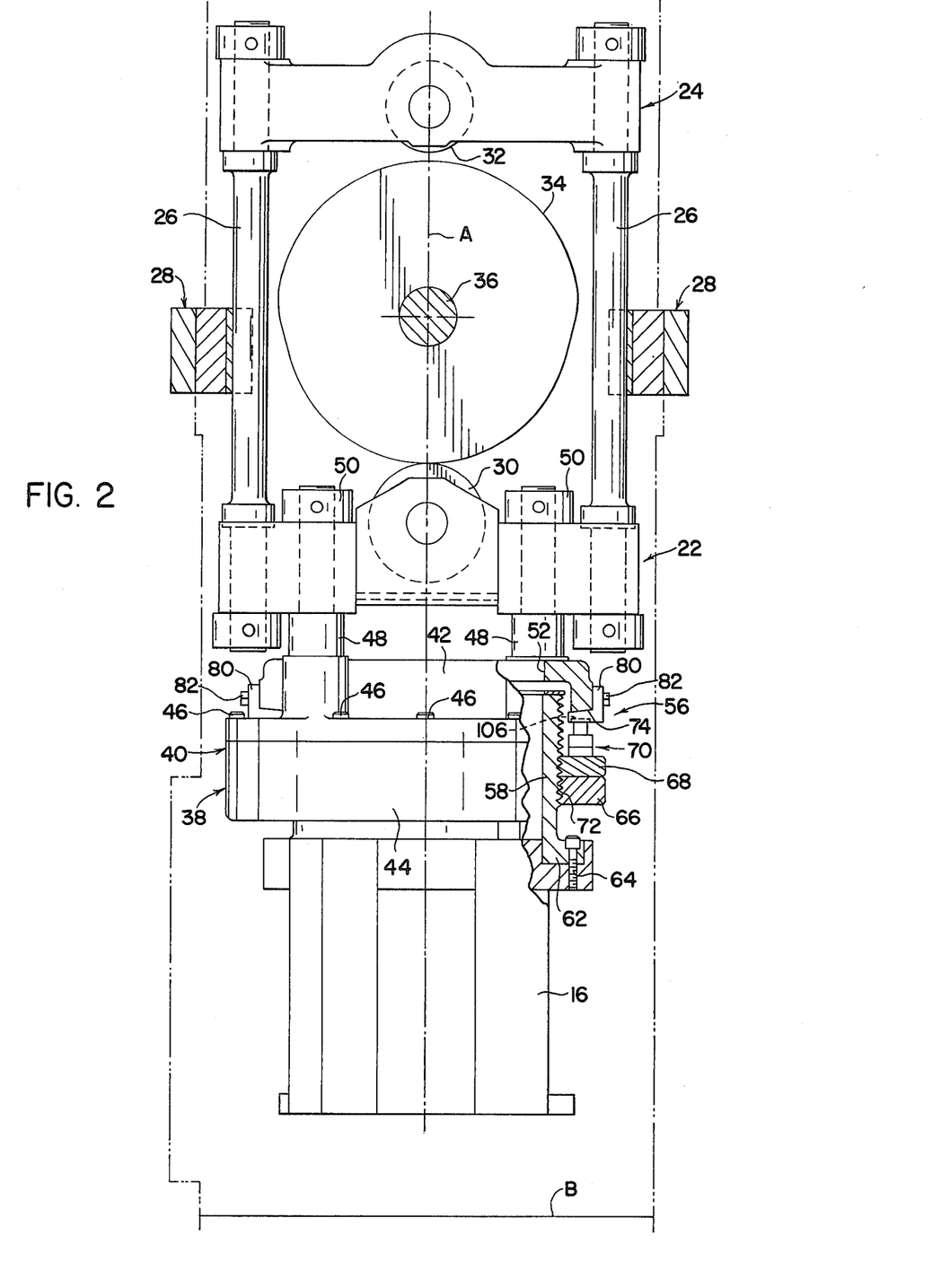
FIG. 2 is a side elevation view of the press structure shown in FIG. 1.
Figure 3:
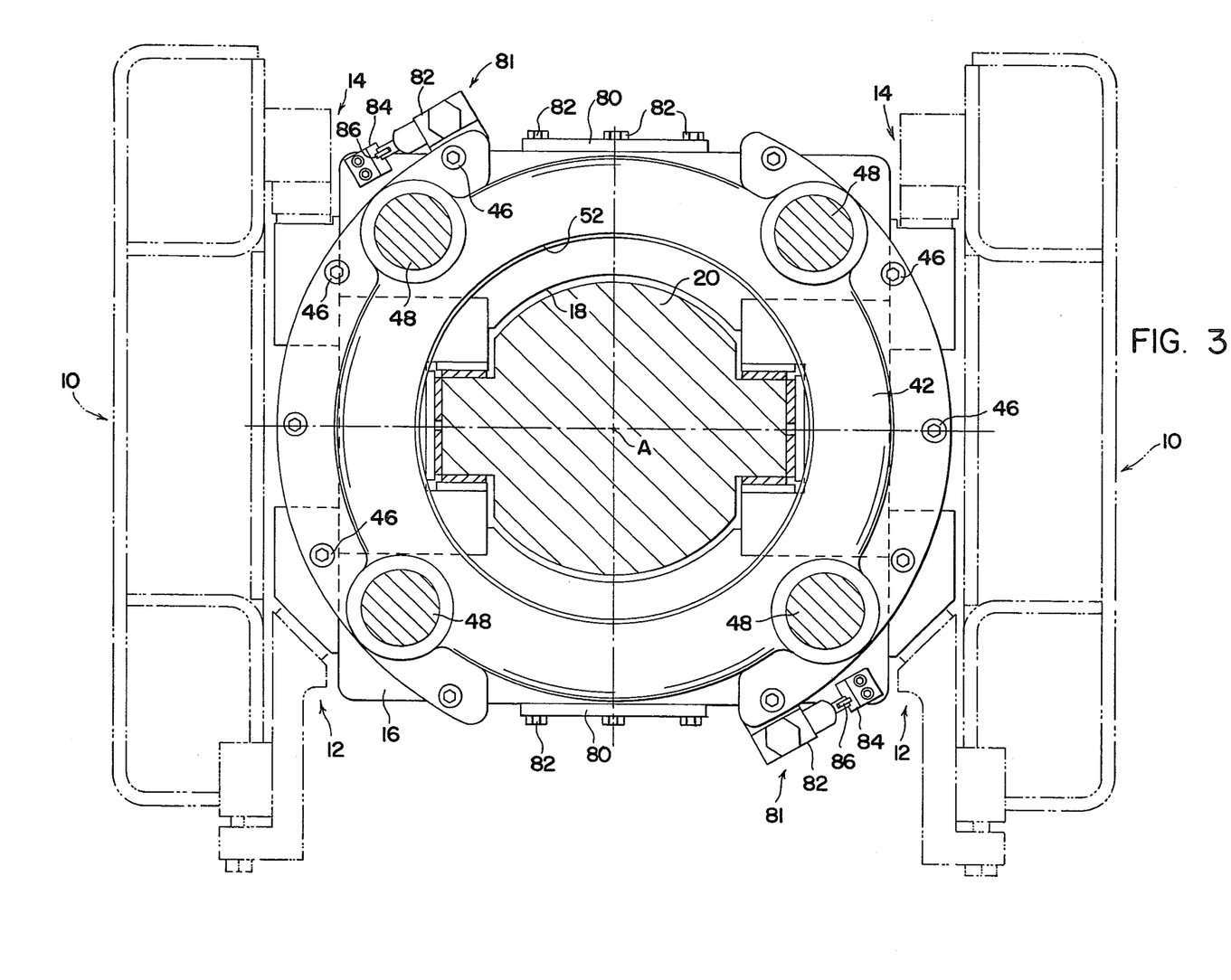
FIG. 3 is a cross-sectional view of the press taken along line 3—3 in FIG. 1.

Referring now in greater detail to the drawings wherein the showings are for the purpose of illustrating a preferred embodiment of the invention only and not for the purpose of limiting the invention, FIGS. 1–3 illustrate a double action press including opposite side frame portions 10 carrying front and rear gibbing 12 and 14, respectively, which supports an outer slide 16 for vertical reciprocation relative to the frame. Slide 16 has an axis A and an opening 18 through the slide provided with gibbing, not designated numerically, supporting an inner slide 20 for vertical reciprocation relative to side frame portions 10 and outer slide 16. The preferred embodiment of the present invention is disclosed herein in conjunction with the outer slide of the press and, accordingly, further details with regard to the inner slide and the drive arrangement therefor are not important.

In the embodiment shown, slide 16 is reciprocated by means of a drive mechanism including a yoke arrangement concentric with slide axis A and comprised of a lower yoke assembly 22 and an upper yoke assembly 24. Yoke assemblies 22 and 24 are interconnected by four tie rods 26 and the yoke assemblies and tie rods are supported as a unit for reciprocation relative to side frame portions 10 by support and guide components 28 extending between and connected to frame portions 10. Lower yoke assembly 22 carries a pair of follower rollers 30 and upper yoke assembly 24 carries a pair of support rollers 32. Cams 34 are positioned between corresponding ones of the rollers 30 and 32 and are mounted on and rotated by a driven shaft 36. An air operated counterbalance arrangement, not shown, normally biases the yoke assemblies upwardly for follower rollers 30 to engage cams 34 during operation of the press. Cams 34 have outer peripheries eccentric with respect to the axis of shaft 36, whereby rotation of the cam results in downward and upward movement of the yoke assemblies. Support rollers 32 engage cams 34 to support the yoke assemblies when the air is released from the counterbalance following press operation.

In accordance with the present invention, slide 16 is connected with lower yoke assembly 22 by means of an adjusting and overload protection assembly 38, whereby reciprocation of the driven yoke assemblies imparts corresponding reciprocation to slide 16 toward and away from the press bed disposed therebeneath as schematically illustrated in FIGS. 1 and 2 and represented by the letter B.

Figure 4:
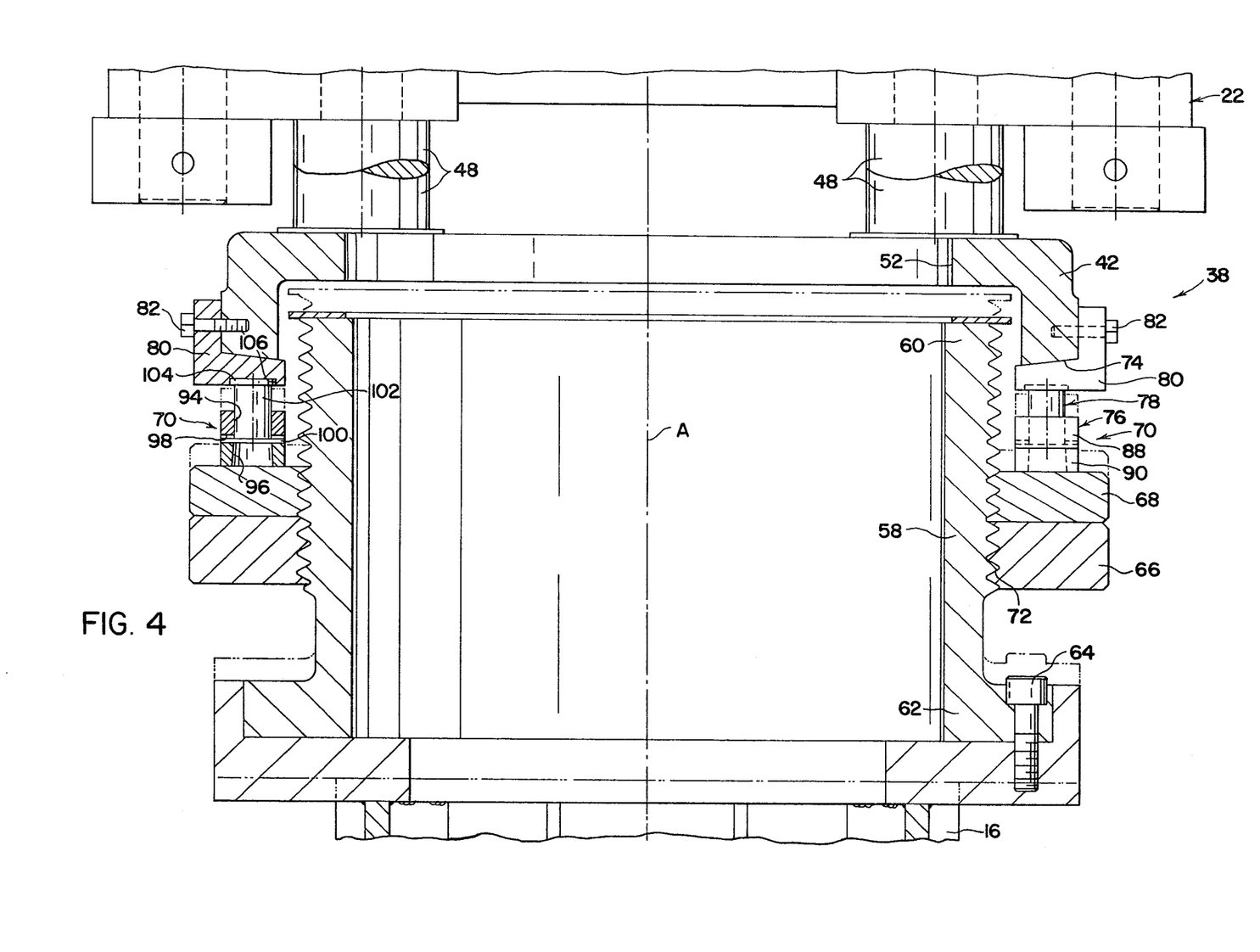
FIG. 4 is a detail elevation view, in section, of the adjusting and overload protection assembly of the present invention.
Figure 5:
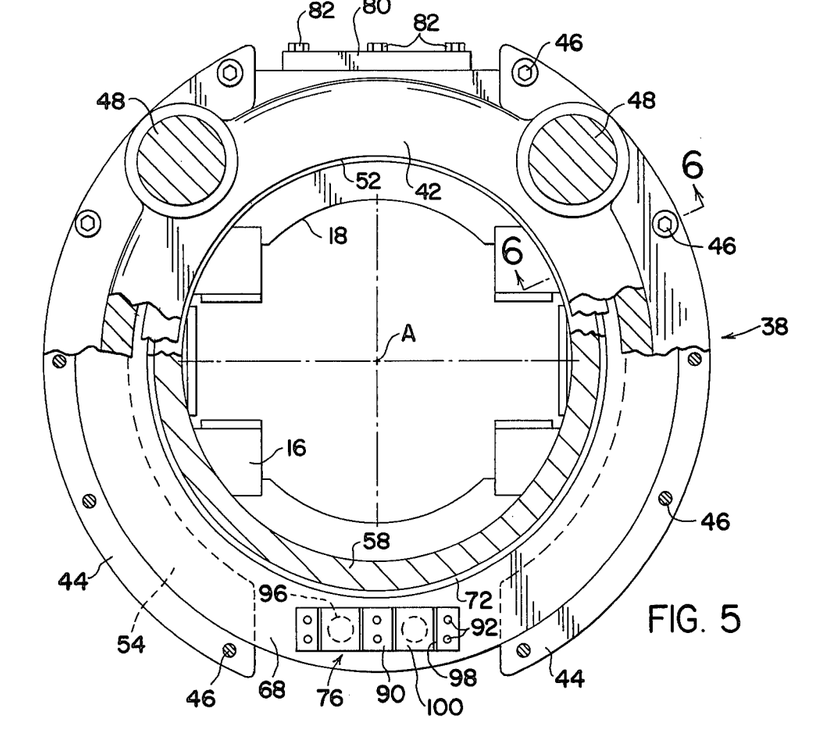
FIG. 5 is a plan view, in section, of the adjusting and overload protection assembly taken along line 5—5 in FIG. 1.
Figure 6:
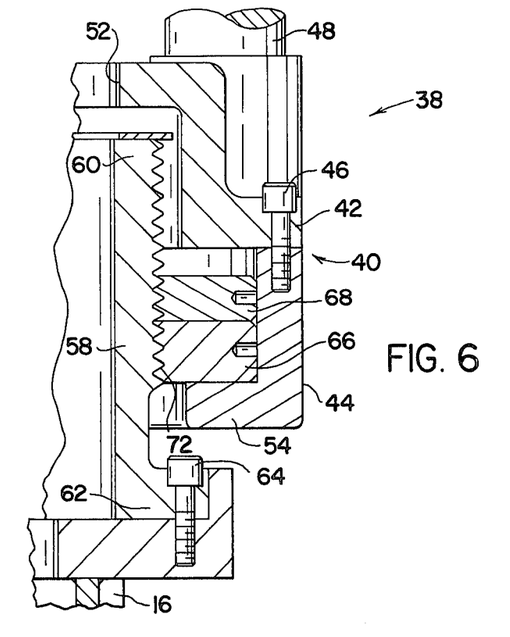
FIG. 6 is a sectional elevation view of the assembly taken along line 6—6 in FIG. 5.

Referring now especially to FIGS. 4–6 of the drawing, adjusting and overload protection assembly 38 includes a first member in the form of a tubular housing 40 comprised of upper and lower housing portions 42 and 44, respectively, releasably interconnected by means of a plurality of studs 46. Housing 40 is coaxial with the slide axis A and the upper or mounting end of the housing is interconnected with lower yoke assembly 22 for movement therewith by means of a plurality of tie rods 48. Rods 48 are integral with housing portion 42 and extend upwardly through corresponding openings in yoke assembly 22. The upper ends of tie rods 48 are threaded to receive nuts 50 by which the housing is securely fastened to the yoke assembly. Upper housing portion 42 includes an opening 52 therethrough to accommodate inner slide 20 and/or drive components therefor. Housing 40 has an open lower end defined by radially inwardly extending flanges 54 each extending circumferentially of lower housing portion 44 between diametrically opposed windows 56 provided in the housing for the purpose set forth hereinafter. Adjusting and overload protection assembly 38 further includes a second member in the form of a sleeve 58 telescopically received in housing 40 and having an inner end 60 disposed within the housing and an outer or mounting end 62 in the form of a circumferentially extending radially projecting flange attached to slide 16 by means of a plurality of studs 64.

Housing 40 and sleeve 58 are interengaged to permit relative axial linear reciprocation therebetween. More particularly, the housing and sleeve are interengaged by slide adjusting and overload protection components which, in the embodiment disclosed, include ring members 66 and 68 carried by sleeve 58 and a pair of shear fixtures 70 described hereinafter and disposed in windows 56 of housing 40. Rings 66 and 68 surround sleeve 58 and are internally threaded for engagement with external threads 72 provided on the outer surface of sleeve 58 between the inner and outer ends thereof. Rings 66 and 68 are disposed within housing 40 and slidably engage the inner surface thereof. Further, ring 66 engages flanges 54 on lower housing portion 44, whereby the flanges define stop elements to limit linear axial movement of sleeve 58 outwardly from within housing 40. Ring 66 is an adjusting ring and ring 68 is a locking ring which in a well known manner interengages with ring 66 to lock the latter in position relative to sleeve 58 and against rotation relative thereto. It will be appreciated that rotation of ring 66 relative to sleeve 58 operates to adjust the distance between the lower end of slide 16 and bed B, thus to adjust the shut height of the slide, and that ring 68 serves to lock ring 66 against rotation so as to maintain the desired shut height.

Windows 56 in housing 40 provide corresponding horizontal shoulders 74 axially spaced from and facing the corresponding peripheral portion of ring 68. Shear fixtures 70 are positioned in windows 56 and are interposed between ring 68 and the corresponding shoulder 74 to releaseably hold sleeve 58 and thus slide 16 against axial displacement upwardly relative to housing 40. As described in greater detail hereinafter, each shear fixture 70 includes a housing 76 supporting shearable metal elements and corresponding plungers 78. Housing 76 rests on the upper surface of ring 68 and the fixture is clamped in place in window 56 by means of a corresponding wedging bracket 80 releaseably secured to upper housing portion 42 such as by bolts 82. The upper ends of plungers 78 engage the underside of bracket 80, and the wedge contour of the bracket provides for the corresponding shear fixture to be tightly captured between shoulder 74 and ring 68.

With the shear fixture so positioned, slide 16 and the component parts of adjusting an overload protection assembly 38 are maintained in normal positions relative to one another, as indicated by the solid line positions of the components in FIG. 4. The normal positions of the components are maintained when slide 16 is reciprocated during press operation so that a blank holding assembly or the like on the lower end of the slide can perform its function during the work stroke of the slide. In the event of an overload on the slide exerting an upward force on the slide which exceeds a predetermined magnitude, the shearable metal elements in shear fixtures 70 are sheared by plungers 78 permitting linear axial displacement of sleeve 58 upwardly or inwardly relative to housing 40. The components are thus displaced to the overload positions thereof, as indicated by broken lines in FIG. 4.

Preferably, as best seen in FIGS. 1 and 3, detectors such as microswitch units 81 are provided to detect the occurrence of an overload and to perform an appropriate control or signal function in response thereto. In this respect, for example, actuation of either switch can operate to stop the press. In the embodiment shown, each switch unit 81 includes a switch housing 82 mounted on lower housing portion 44 of adjusting and overload protection assembly 38, and a cam block 84 mounted on slide 16 in position to engage a roller type actuator stem 86 of the switch. It will be appreciated that the switch and cam block are so positioned that movement of slide 16 from the normal toward the overload position mentioned above causes actuation of the switch units. Preferably, the switch units are positioned in diametrically opposed locations relative to adjusting and overload protection assembly 38 and each of which locations is circumferentially adjacent one of the shear fixtures 70. Thus, in the event of the occurrence of an overload which would cause a break down of just one of the shear fixtures 70 the corresponding switch unit would be actuated to shut down the press.

Figure 7:
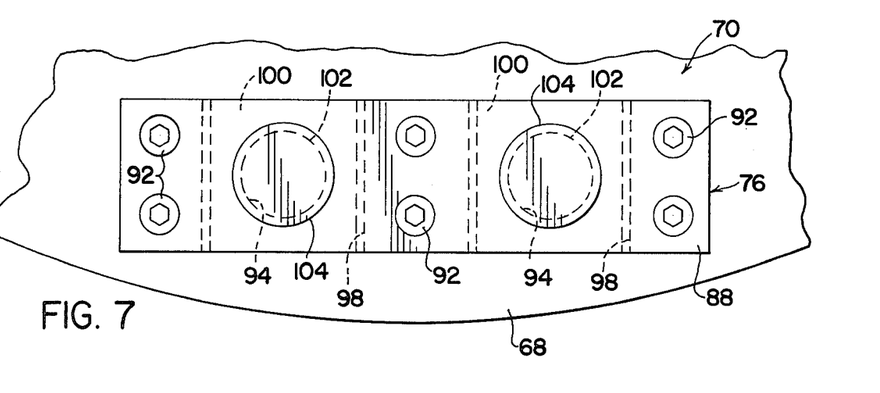
FIG. 7 is a plan view of the shear fixture of the assembly.
Figure 8:
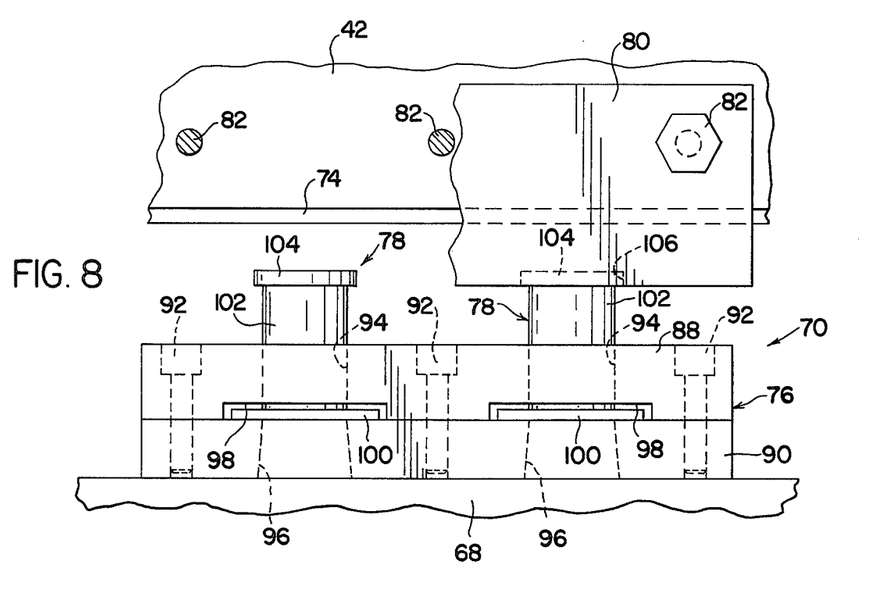
FIG. 8 is a side elevation view of the shear fixture.

The structure of shear fixtures 70 referred to above is best seen in FIGS. 7 and 8 of the drawing. In this respect, housing 76 of each shear fixture is comprised of upper and lower rectangular housing blocks 88 and 90, respectively, releaseably interconnected by means of a plurality of studs 92. Housing block 88 is provided with a pair of circular openings 94 therethrough and block 90 is provided with a pair of downwardly and outwardly tapering frustoconical openings 96 each axially aligned with one of the openings 94. Upper housing block 88 is further provided with a pair of rectangular slots 98 extending transversely across openings 94, each of which slots is adapted to receive a flat metal shear plate 100. Each plunger 78 includes a circular pin 102 having an inner end slidably received in the corresponding opening 94 and abutting against the underlying shear plate 100. The outer end of each pin is spaced from the corresponding side of housing block 88 and is provided with a head 104. Preferably, as will be understood from FIG. 4, the underside of wedge members 80 are provided with pairs of circular recesses 106 each receiving one of the heads 104 of the plungers of the corresponding shear fixture to facilitate positioning the fixture and to stabilize the shear fixture against radial and circumferential displacement relative to housing 40 and ring 68. While each shear fixture 70 preferably has two shear plates and plungers, it will be appreciated that the fixture can have one or more than two plate and plunger assemblies. It will be appreciated from the description of shear fixture 70 that the fixture is readily removable and replaceable with respect to the adjusting and overload protection assembly and can readily be disassembled and reassembled if necessary in connection with replacing metal plates 100 and repositioning plungers 78 following the shearing of the plates in response to an overload condition.

While considerable emphasis has been placed herein on the specific structures and structural interrelationships between component parts of the adjusting and overload protection assembly disclosed, it will be appreciated that many modifications can be made in the preferred arrangement without departing from the principles of the present invention. For example, the adjusting and overload protection assembly can be inverted from the position herein shown and sleeve 58 mounted to the driven component of the press and housing 40 mounted on the slide. Further, it will be appreciated that other shear fixture structures can be devised and employed in place of fixtures 70 and that overload responsive assemblies other than shear fixtures can be employed to achieve the overload response function. For example, suitable hydraulic pressure responsive devices could be employed in place of shear fixtures. Additionally, it will be appreciated that detectors other than microswitch units can be used to respond to relative displacement between the components of the adjusting and overload protection assembly. Still further, suitable clamping arrangements can be devised for locking the adjusting ring in position relative to sleeve 58 either with or without the use of a locking ring as herein shown. Many such modifications and changes can be devised and will be suggested or obvious from the foregoing description of the preferred embodiment. Accordingly, it is to be distinctly understood that the foregoing descriptive matter is to be interpreted merely as illustrative of the present invention and not as a limitation.

What is claimed is:

1. A slide adjustment and overload protection assembly for a press including a slide having an axis and driven means to axially reciprocate said slide, said assembly comprising, first and second members coaxial with said slide and connectable one to said slide and the other to said driven means, and interengaging means on said first and second members supporting said members for axial sliding movement relative to one another between normal and overload positions, said interengaging means including adjusting means interconnected with said second member for axial adjustment relative thereto, and overload responsive means interposed between said adjusting means and said first member releaseably holding said members in said normal position, said overload responsive means including a housing removably mounted between said adjusting means and said first member, shearable metal means removably supported by said housing, and shearing member means separate from said shearable metal means and removably supported by said housing, said housing, shearable metal means and shearing member means being removable as a unit from between said adjusting means and said first member.

2. The assembly according to claim 1, and detecting means actuated by movement of said members from said normal toward said overload position.

3. The assembly according to claim 1, wherein said adjusting means is ring means threadedly interconnected with said second member, said interengaging means further including stop means on said first member axially engaging said ring means when said first and second members are in said normal position.

4. The assembly according to claim 3, wherein said ring means includes cooperable adjusting and locking ring members.

5. A slide adjustment and overload protection assembly for a press including a slide having an axis and driven means to axially reciprocate said slide, said assembly comprising, first and second members coaxial with said slide and connectable one to said slide and the other to said driven means, and interengaging means on said first and second members supporting said members for axial sliding movement relative to one another between normal and overload positions, said interengaging means including adjusting means interconnected with said second member for axial adjustment relative thereto, and overload responsive means interposed between said adjusting means and said first member releaseably holding said members in said normal position, said adjusting means being ring means threadedly interconnected with said second member, said interengaging means further including stop means on said first member axially engaging said ring means when said first and second members are in said normal position, said first member including shoulder means axially spaced from said stop means, and said overload responsive means being interposed between said ring means and said shoulder means.

6. The assembly according to claim 5, wherein said overload responsive means includes shearable metal means and shearing member means removably mounted between said ring means and shoulder means.

7. A slide adjustment and overload protection assembly for a press including a slide having an axis and driven means to axially reciprocate said slide, said assembly comprising, first and second members coaxial with said slide and connectable one to said slide and the other to said driven means, and interengaging means on said first and second members supporting said members for axial sliding movement relative to one another between normal and overload positions, said interengaging means including adjusting means interconnected with said second member for axial adjustment relative thereto, and overload responsive means interposed between said adjusting means and said first member releaseably holding said members in said normal position, said adjusting means being ring means threadedly interconnected with said second member, said interengaging means further including stop means on said first member axially engaging said ring means when said first and second members are in said normal position, said fist member being tubular and having a mounting end and a second end, said second member having a mounting end and an inner end telescopically received in said second end of said first member, said ring means being on said second member between said mounting and inner ends thereof and projecting radially outwardly of said second member, said stop means being radially inwardly extending flange means on said second end of said first member.

8. The assembly according to claim 7, wherein said first member has diametrically opposed openings between said mounting and second ends thereof, each said opening providing a shoulder axially spaced from said flange means, said overload responsive means including an overload responsive assembly removably mounted between said ring means and each said shoulder.

9. The assembly according to claim 8, wherein each said overload responsive assembly includes axially opposed shearable metal means and shearing member means.

10. The assembly according to claim 9, wherein said metal means is a planar plate and said shearing member means is a plunger, said overload responsive assembly further including housing means having axially opposite sides and an axial opening therethrough, said housing means including means to support said plate transverse to said opening and between said opposite sides, and said plunger including an inner end received in said opening from one of said opposite sides and abutting said plate and an outer end extending outwardly from said one side of said housing means.

11. A slide adjustment and overload protection assembly for a press including a slide having an axis and coaxial driven means to axially reciprocate said slide, said assembly comprising hollow housing means coaxial with said slide and having a first end for connection with said driven means and an open second end axially spaced from said first end toward said slide, sleeve means coaxial with said housing means and having an inner end slidably received in said second end of said housing means and an outer end for connection with said slide, adjusting ring means surrounding said sleeve means within said housing means and threadedly interengaged with said sleeve means for adjustment axially of said sleeve means, said housing means including stop means at said second end extending radially inwardly of said sleeve means and engaged by said ring means to limit linear displacement of said sleeve means axially outwardly of said second end, said housing means including means providing shoulder means axially spaced from said stop means, said shoulder means and ring means being axially spaced apart when said ring means engages said stop means, and overload responsive means interposed between said ring means and shoulder means releaseably holding said ring means against said stop means.

12. The assembly according to claim 11, wherein said overload responsive means includes shearable metal means and corresponding shearing member means.

13. The assembly according to claim 12, wherein said overload responsive means further includes means removably supporting said metal means and shearing member means between said ring means and shoulder means.

14. The assembly according to claim 12, wherein said shoulder means includes shoulders at diametrically opposed locations on said housing means and said overload responsive means includes two of said shearable metal means and corresponding shearing member means each disposed in one of said diametrically opposed locations.

15. The assembly according to claim 11, and switch means mounted on said housing means and actuable in response to release of said ring means and linear movement of said sleeve means axially inwardly of said housing means.

16. The assembly according to claim 11, wherein said ring means includes an adjusting ring member and a locking ring member.

17. The assembly according to claim 11, wherein said overload responsive means includes a pair of shear fixtures removably mounted between said shoulder means and ring means at diametrically opposed locations with respect to said housing means, each said shear fixture including shearable metal plate means and corresponding shearing plunger means.

18. The asembly according to claim 17, wherein each said shear fixture further includes a housing having axially opposite sides, a pair of openings therethrough between said sides and a pair of slots intermediate said opposite sides and each transversely intersecting one of said openings, said metal plate means including a planar metal plate in each of said slots, and said plunger means including a plunger member received in each of said openings from one of said opposite sides and having an inner end abutting the corresponding plate and an outer end spaced from said one side.

* * * * *